US012800386B2

(12) United States Patent
Camus

(10) Patent No.: US 12,800,386 B2
(45) Date of Patent: Nov. 17, 2026

(54) LIGHT BEAM CHARACTERIZATION SYSTEM

(71) Applicant: Leica Microsystems CMS GmbH, Wetzlar (DE)

(72) Inventor: Nicolas Camus, Wetzlar (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 151 days.

(21) Appl. No.: 18/826,216

(22) Filed: Sep. 6, 2024

(65) Prior Publication Data

US 2025/0102354 A1 Mar. 27, 2025

(30) Foreign Application Priority Data

Sep. 22, 2023 (EP) .................................... 23199001

(51) Int. Cl.
*G01J 1/42* (2006.01)
*G01J 1/04* (2006.01)

(52) U.S. Cl.
CPC ........... *G01J 1/4257* (2013.01); *G01J 1/0411* (2013.01); *G01J 1/0414* (2013.01)

(58) Field of Classification Search
CPC ...... G01J 1/4257; G01J 1/0411; G01J 1/0414; G01J 2001/4261
See application file for complete search history.

(56) References Cited

U.S. PATENT DOCUMENTS

| | | | | |
|---|---|---|---|---|
| 6,922,233 B2 | 7/2005 | Riza | | |
| 2004/0125361 A1* | 7/2004 | Riza | G01J 1/4257 | 356/121 |
| 2006/0146395 A1* | 7/2006 | Gross | G02B 27/106 | 359/305 |

(Continued)

OTHER PUBLICATIONS

Riza, Nabeel A. et al.; "Optical Power Independent Optical Beam Profiler"; *Optical Engineering*; Apr. 1, 2004; pp. 793-797; vol. 43, No. 4; XP002811125; Society of Photo-Optical Instrumentation Engineers (SPIE); Bellingham, CA, USA.

(Continued)

*Primary Examiner* — Tarifur R Chowdhury
*Assistant Examiner* — Akbar H. Rizvi
(74) *Attorney, Agent, or Firm* — LEYDIG, VOIT & MAYER, LTD.

(57) ABSTRACT

A system for characterizing a light beam includes a detector that includes at least one detector unit, and a micro-opto-electromechanical system that includes an array of mirrors. Each mirror is switchable between a first sand a second witching states. In the first switching state, the mirror reflects light emitted by a light source onto the detector. In the second switching state, the mirror reflects the light away from the detector. The system further includes a controller configured to cause a beam profile measurement to be performed on the light detected by the detector unit while selectively switching the mirrors between the first and the second switching states, and an optical unit configured to direct the light in a form of two different input light beams (Continued)

onto the micro-opto-electromechanical system. The controller is configured to cause the beam profile measurement to be performed on each of the two input light beams.

17 Claims, 6 Drawing Sheets

(56) References Cited

U.S. PATENT DOCUMENTS

| | | | | |
|---|---|---|---|---|
| 2013/0114630 | A1* | 5/2013 | Cui | H01S 3/0057 372/25 |
| 2020/0256960 | A1* | 8/2020 | LaChapelle | G01S 7/4863 |
| 2022/0191440 | A1* | 6/2022 | Pertierra | G02B 27/46 |

OTHER PUBLICATIONS

Sheikh, Mumtaz et al.; "Demonstration of Pinhole Laser Beam Profiling Using a Digital Micromirror Device"; *IEEE Photonics Technology Letters*; May 15, 2009; vol. 21, No. 10; IEEE; Piscataway, NJ, USA.

* cited by examiner

LIGHT BEAM CHARACTERIZATION SYSTEM

CROSS REFERENCE TO RELATED APPLICATIONS

This application claims benefit to European Patent Application No. EP 23199001.1, filed on Sep. 22, 2023, which is hereby incorporated by reference herein.

FIELD

Embodiments of the present invention relate to a light beam characterization system.

BACKGROUND

The characterization of a laser beam is of general importance for all laser applications. Such a characterization allows to monitor and control the spatial distribution of the energy in the laser beam and to detect potential problems in the beam path. This is also true for confocal and multiphoton microscopy techniques, where a laser source is used to illuminate the sample. Here, it is necessary to illuminate the imaging objective with the laser beam in a controlled manner to obtain the best illumination point spread function (PSF) at the focal position.

Meeting these requirements is difficult in multiphoton systems. Thus, in multiphoton systems, the laser source may be controlled to change the wavelength and so the beam characteristics in terms of parameters such as size, waist position, and beam orientation. The beam path may contain several variable optical elements to control the laser beam such as slow and fast optical modulators, variable beam expanders, different mirrors adapted to different laser beams and wavelengths. Furthermore, the laser beam path is inherently longer, which leads to larger errors in beam steering. In commercial multiphoton systems of the applicant, different illumination modes are provided. In an illumination mode directed to high spatial resolution, apertures of different objectives are fully illuminated. In contrast, in an illumination mode directed to a better tissue depth penetration, a degree of filling of the aperture is lower. Precise beam profiling is needed to accurately control the different illumination modes.

To meet these requirements, a beam characterization unit may be used to perform beam profile measurements. Such a unit is for example configured to conduct a so-called knife edge measurement where a knife edge-like component is used to block a successively larger (or smaller) portion of the light while measuring the intensity of the successively smaller (or larger) transmitted portion of the light. By doing so, a beam profile can be measured. In an advantageous way, the beam characterization unit is configured to perform the knife edge measurement at different wavelengths.

A beam characterization unit of another type is configured to measure the beam position in order to compensate for a possible deviation of the beam. For this type of beam profile measurement, a position sensitive detector (PSD) such as a four-quadrant diode can be used which comprises four separate detector elements to determine the centroid of the laser beam and thus its position. However, a typical PSD used for beam characterization is a costly component by itself, and it can be operated only over a limited wavelength range, typically from about 680 nm to about 1100 nm.

Another possibility for beam characterization is to use a camera having a large number of pixels, which makes it possible to measure the spatial distribution of the light beam in a plane coinciding with the detection surface of the camera. However, since the light distribution is only detected in a single plane, complete beam characterization with a camera is not possible.

For sufficient characterization of a laser beam, the above beam profile measurements must be performed at least at two different locations in the beam path, which is costly in terms of the components required.

The article of Riza, N. A., Mughal, M. J., "Optical power independent optical beam profiler", (2004), Optical Engineering, 43 (44), pp. 793-79, doi: 10.10.1117/1.651557 discloses a micro-opto-electromechanical system (MOEMS) comprising a large number of microscopically small mirrors which are individually tiltable between two tilting positions. This system which is also known as digital micromirror device (DMD) is used in a beam profiler instrument to perform a knife edge measurement. A similar system is described in the article of Sheikh, M., Riza, N. A., "Demonstration of Pinhole Laser Beam Profiling Using a Digital Micrometer Device", (2009), IEEE Photonics Technology Letters, Vol. 21, No. 10, pp. 666-668.

SUMMARY

Embodiments of the present invention provide a light beam characterization system for characterizing a light beam emitted by a light source. The light beam characterization system includes a detector that includes at least one detector unit configured to detect light emitted by the light source, and a micro-opto-electromechanical system that includes an array of mirrors. Each respective mirror is switchable between a first switching state and at least a second switching state. In the first switching state, the respective mirror reflects the light onto the detector. In the second switching state, the respective mirror reflects the light away from the detector. The light beam characterization system further includes a controller configured to cause a beam profile measurement to be performed on the light detected by the at least one detector unit while selectively switching the mirrors in the array of mirrors between the first switching state and the second switching state, and an optical unit configured to direct the light in a form of at least two different input light beams onto the micro-opto-electromechanical system. The controller is configured to cause the beam profile measurement to be performed on each of the at least two input light beams.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
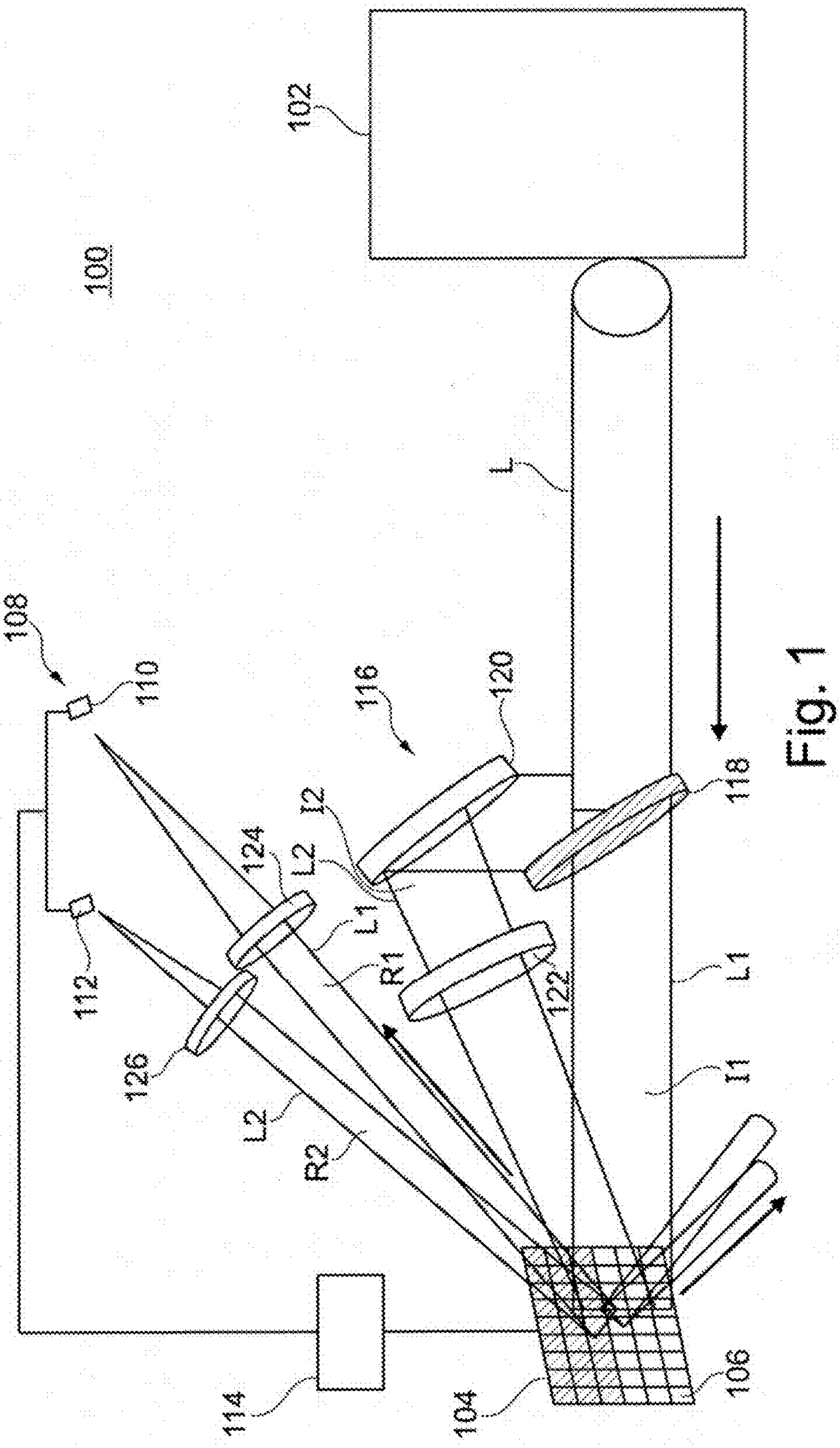
FIG. 1 is a schematic diagram showing a light beam characterization system according to an embodiment which comprises an optical unit with a beam splitter simultaneously directing two input light beams onto a digital micromirror device.

Embodiments of the present invention provide a system that enables simple yet reliable beam characterization.

A light beam characterization system for characterizing a light beam being emitted by a light source includes a detector device comprising at least one detector unit configured to detect the light, and a micro-opto-electromechanical system comprising an array of mirrors. Each mirror is switchable between a first switching state, in which the mirror reflects the light onto the detection device, and at least a second switching state, in which the mirror reflects the light away from the detector device. The light beam characterization system comprises a controller configured to cause a beam profile measurement to be performed on the light detected by the at least one detector unit while selectively switching the mirrors between the first and second switching states. The light beam characterization system further comprises an optical unit configured to direct the light in form of at least two different input light beams onto the micro-opto-electromechanical system. The controller is configured to cause the beam profile measurement to be performed on each of the at least two input light beams.

In order to characterize a light beam, such as a laser beam, it may be necessary to perform a beam profile measurement at two different beam locations. For instance, in case of a Gaussian light beam, two beam profile measurements enable the light beam to be completely characterized. While conventional approaches use two light beam characterization units that are spatially separated in the beam path, the solution presented here involves generating at least two input light beams from the light emitted by the light source. For this purpose, an optical unit is provided which is configured to convert the light emitted by the light source into at least two input light beams that propagate, simultaneously or sequentially, toward the micro-opto-electromechanical system. These two input light beams can be used to perform two beam profile measurements at two different axial positions of the light emitted by the light source using a single light beam characterization unit. In order to realize different axial positions, the optical unit may ensure that two different transverse planes are imaged onto the micro-opto-electromechanical system. Since both input light beams are obtained from the same light emitted from the light source, two beam profile measurements performed on the two input light beams, which may go through elements having different optical power up to the micro-opto-electromechanical system, correspond to two measurements performed on a single light beam at different axial positions within the optical path of this light beam.

For example, the solution presented herein is beneficial in confocal or multiphoton scanning microscope systems, where a combination of two knife edges and different PSDs has previously been used to characterize the laser beam and to track the laser position in real time.

In a preferred embodiment, it is possible to use a combination of a micro-opto-electromechanical system and a cost-effective single element detector such as a single pixel diode to fully characterize the light beam spatially. The use of a simple light sensor instead of a camera or PSD allows more flexibility with respect to the wavelength range of the laser beam. In particular, using such a light sensor allows the characterization of laser beams with longer wavelengths, e.g. larger than 1100 nm, which may be applied in multiphoton microscopy.

Considering a Gaussian light beam, it is thus possible to completely characterize the beam with regards to its waist size, waist position, beam position and beam pointing, i.e. the direction along which the light beam propagates. Once the laser beam has been characterized, a variable beam expander and motorized mirrors may be used to control the laser beam in terms of the parameters mentioned above.

A micro-opto-electromechanical system (MOEMS) is to be understood as a system which is based on a technology that integrates micro-electromechanics (MEMS) and optoelectronics. Such a micro-opto-electromechanical system is a highly miniaturized device capable of manipulating light with very high precision.

Preferably, the micro-opto-electromechanical system used herein may be configured as a digital micromirror device (DMD) including an array of mirrors, each of which can be controlled electronically. By tilting these tiny mirrors, light can be reflected in different directions. Due to their speed and precision, a digital micromirror device is extremely efficient at affecting light as desired.

Alternatively, the micro-opto-electromechanical system may be a deformable mirror as used in adaptive optics. Such a mirror may include a plurality of mirror segments which are individually controlled by a plurality of actuators. Alternatively, the deformable mirror may have a continuous mirror surface formed e.g. from a deformable membrane. The shape of the membrane is controlled by a number of actuators fixed at the backside of the mirror. Thus, while in this case the micro-opto-electromechanical system includes a continuous mirror surface rather than physically separated individual mirror elements, the array of actuators arranged on the backside of the deformable mirror determines a plurality of portions on the continuous mirror surface that can be considered as an array of tiny mirrors. The deformable mirror is capable of continuously adjusting a tilting angle at a given location on the mirror surface, rather than just assuming two discrete switching states.

In a preferred embodiment, the optical unit is configured to generate the at least two input light beams from the light such that different axial beam positions of the at least two input light beams are imaged onto the micro-opto-electromechanical system simultaneously or sequentially. The optical unit may be configured such that the element(s) in the two beam paths have different optical power. In other words, the optical unit may be configured to image two different transverse planes onto the micro-opto-electromechanical system, which corresponds to performing the at last two beam profile measurements at different axial beam positions along the beam path.

Preferably, the optical unit is configured to direct the at least two input light beams simultaneously onto the micro-opto-electromechanical system. The detector device may comprise at least two detector units, each detector unit being configured to detect a different one of the at least two input light beams reflected by mirrors of the micro-opto-electromechanical system in the first switching state. The controller may be configured to cause the beam profile measurement to be performed on each of the at least two input light beams. In this embodiment, the optical unit may split the beam path of the light emitted by the light source into two spatially separated beam paths in which the input light beams propagate through elements with different optical power to the micro-opto-electromechanical system. Each mirror of the micro-opto-electromechanical system receiving the two input light beams in the first switching state reflects one of these light beams to one of the detector units and the other light beam to the other detector unit.

The optical unit may be configured to direct the at least two input light beams simultaneously along different incidence beam paths onto the micro-opto-electromechanical system so that mirrors of the micro-opto-electromechanical system reflect the at least two input light beams in the first switching state simultaneously along different reflexion beam paths onto the at least two detector units. Here, the optical unit may split the beam path of the light emitted by the light source into two spatially separated beam paths in which the input light beams propagate over different path lengths to the micro-opto-electromechanical system.

In a preferred embodiment, the optical unit comprises a beam splitter configured to generate one of the two input light beams by transmitting the light and to generate the other input light beam by reflecting the light. The characteristics of the beam spitter may be wavelength-dependent so that the input light beams to be detected have different wavelengths. In this case, a detector unit specially designed for a specific wavelength range can be provided for each input light beam. Overall, the light emitted by the light source can thus be characterized over a wider wavelength range than is possible with a single detector unit.

Alternatively, a neutral beam splitter having essentially a 50:50 splitting characteristic may be used without significantly changing the spectral composition of the input light beams compared to the light emitted by the light source. Such a beam splitter can be used, for example, when the wavelength range of the light emitted by the light source is limited and identical detector units are used.

The optical unit may comprise an optical redirecting element which is located downstream of the beam splitter and configured to direct one of the input light beams onto the micro-opto-electromechanical system. Such a redirecting element may be a mirror or a prism. This makes it possible to realize a compact optical design.

According to another embodiment, the optical unit may be configured to direct the at least two input light beams successively onto the micro-opto-electromechanical system. The detector device may comprise a single detector unit configured to detect the at least two input light beams reflected by mirrors of the micro-opto-electromechanical system in the first switching state. The controller may be configured to cause the beam profile measurement to be performed on each of the at least two input light beams. To generate the two input light beams in this embodiment, the light emitted by the light source is switched sequentially such that different axial beam positions of the light are imaged onto the micro-opto-electromechanical system. This allows for a compact optical design.

Specifically, the optical unit may be configured to direct the at least two input light beams sequentially along a common incidence beam path onto the micro-opto-electromechanical system so that mirrors of the micro-opto-electromechanical system reflect the at least two input light beams in the first switching state sequentially along a common reflexion beam path onto the single detector unit. Thus, the light emitted from the light source is directed onto the micro-opto-electromechanical system along a single beam path. Accordingly, a single detector unit can be used which makes the optical design compact.

In a preferred embodiment, the optical unit may comprise a variable optical element. The variable optical element, which may be formed from one or more lenses, is configured to vary the focusing of the light onto the micro-opto-electromechanical system. For example, a first beam profile measurement is performed based on a first optical setting of the variable optical element. Subsequently, a second beam profile measurement is performed based on a second optical setting of the variable optical element wherein the second setting differs from the first setting. As a result, the input light beams can be easily generated one after the other in a single beam path by controlling the variable optical element accordingly.

Such a variable optical element may be implemented by one or more optical lenses that are axially movable along the beam path to vary the focusing state. Alternatively, an adaptive optical element such as a liquid lens or a membrane lens may be used. An adaptive optical element is capable of changing its shape to adjust an optical property such as the focal length.

Each detector unit may include at least two detector elements which are sensitive to different wavelengths. Using multiple detector elements having different spectral sensitivities allows to perform a single beam profile measurement over a wide wavelength range.

Preferably, each detector element is selectively movable into and out of a beam profile measurement position. In such an embodiment, the beam characterization system may include an actuator controlled to sequentially move the detector elements into the beam path of the laser light reflected at the micro-opto-electromechanical system to detect different wavelength ranges. As result, a beam characterization over a wide spectral range is possible. Alternatively, a beam splitter may be arranged or selectively moved into the beam path to spectrally split the light between at least two detector elements. In such a case, the detector elements are operated simultaneously to perform the beam profile measurement over a broad spectral range.

As detecting means a power meter may be used which has the advantage of providing a wide range of wavelengths. Such a power meter is sensitive to the thermal power of the laser beam and therefore less limited in terms of spectral bandwidth than, for example, a typical photodiode.

In a preferred embodiment, the controller is configured to sequentially switch rows or columns of mirrors of the micro-opto-electromechanical system from the one of the first and second switching states into the other switching state to generate a scanning knife edge light pattern on the detector device. Each row or column can be switched completely or only partially. Assumed that the rows and columns of the mirror array are aligned in horizontal direction and vertical direction, respectively, a vertical knife edge can be simulated as follows. First, all mirrors of the array are switched into the first switching state where the mirrors reflect the laser light onto the detector device. Thus, the entire laser beam is captured by the detector device. Subsequently, the mirrors included in the first row of the mirror array are tilted from the first switching state into the second switching state so that these mirrors reflect the laser beam away from the detector device. In the same way, the second row, the third row etc. of the mirror array are successively switched from the first state into the second switching state. As a result, a vertical knife edge pattern is scanned across the light beam.

Preferably, the controller is configured to switch a two-dimensional sub-array of mirrors of the micro-opto-electromechanical system from one of the first and second switching states into the other switching state while leaving the remaining mirrors in the one switching state to generate an alternating area light pattern on the detector device. Such a beam profile measurement can be used to measure a beam position in order to compensate for a possible deviation of the beam. For example, the afore-mentioned two-dimensional sub-array of mirrors may represent a quadrant as applied in a four-quadrant measurement. In such a measurement, one of four quadrants on the micro-opto-electromechanical system is activated one after the other, so that only the light reflected from this quadrant reaches the detector device. Based on the light detected successively for all four quadrants, the centroid of the light is determined from which the beam position can be derived.

In a preferred embodiment, the light beam characterization system comprises a focusing optical element which is located downstream of the micro-opto-electromechanical system and configured to focus the at least two input light beams onto the detector device. Thus, it is possible to use a detector device with a smaller detection area that is less expensive and easier to exchange.

The light beam characterization system may further comprise a nonlinear crystal located upstream of the detector device and configured for second harmonic generation. For example, such a second harmonic crystal may be arranged in the light beam focused immediately in front of the detector to create a second harmonic wavelength in the visible range in doubling the frequency of infrared or near-infrared light. Thus, the infrared or near-infrared light beam can be made visible to a silicon detector instead of having to use a different type of detector which is specifically suited for near-infrared or infrared detection.

According to another embodiment, a method for light beam characterization is provided. The method comprising following steps: detecting light emitted by a light source by means of at least one detector unit included in a detector device; and performing a beam profile measurement on the light detected by the at least one detector unit by means of a micro-opto-electromechanical system comprising an array of mirrors, each mirror being switchable between a first switching state, in which the mirror reflects the light onto the detection device, and at least a second switching state, in which the mirror reflects the light away from the detector device. The beam profile measurement is performed while selectively switching the mirrors between the first and second switching states. The light is directed by means of an optical unit onto the micro-opto-electromechanical system in form of two different input light beams. The beam profile measurement is performed on each of the at least two input light beams.

According to an alternative embodiment, a light beam characterization system is provided which comprises a light source configured to emit light, a detector device comprising at least one detector unit configured to detect the light, and a micro-opto-electromechanical system comprising an array of mirrors. Each mirror is switchable between a first switching state, in which the mirror reflects the light onto the detection device, and at least a second switching state, in which the mirror reflects the light away from the detector device. The light beam characterization system comprises a controller configured to cause a beam profile measurement to be performed on the light detected by the at least one detector unit while selectively switching the mirrors between the first and second switching states. The light beam characterization system further comprises an optical unit including an optical element which is located downstream of the micro-opto-electromechanical system and configured to focus the light reflected by mirrors of the micro-opto-electromechanical system in the first switching state onto the detector device.

In this alternative embodiment, it is not necessary that the optical unit is configured to direct the light in form of at least two different input light beams onto the micro-opto-electromechanical system, and it is also not necessary that the controller is configured to cause the beam profile measurement to be performed on each of the at least two input light beams. Rather, instead of these features, the optical unit may comprise an optical element which is located downstream of the micro-opto-electromechanical system. The optical element may be formed from one or more optical lenses. The use of such an optical element enables a cross section of the light beam incident on the detector device to be reduced. Therefore, a detection area on which the detector device receives the light beam can be smaller. As a result, a simpler and less expensive detector device such as a single point detector can be used.

FIG. 1 shows a light beam characterization system 100 according to an embodiment. It is to be noted that FIG. 1 is a simplified schematic illustration of the light beam characterization system 100 which serves only to explain the principle of operation.

The light beam characterization system 100 comprises a light source 102. In the present embodiment, it is assumed that the light source 102 is configured to emit laser light L within a predetermined wavelength range. The light beam characterization system 100 further includes a micro-opto-electromechanical system (MOEMS). In the present embodiment, the micro-opto-electromechanical system is formed from a digital micromirror device (DMD) 104 including an array of mirrors 106. Each of the mirrors 106 can be individually controlled to be switched between a first switching state and a second switching state. The respective mirror 106 is switched by being tilted between two different orientations.

The light beam characterization system 100 further comprises a detector device 108 which serves to detect the light L that is emitted by light source 102 and reflected by the digital micromirror device 104. In the embodiment shown in FIG. 1, the light source 108 comprises two detector units 110, 112 which are spatially separated from each other. Furthermore, a controller 114 serves to control the overall operation of the system. In particular, the controller 114 causes the digital micromirror device 104 and the detector units 110, 112 to operate as explained below.

An optical unit 116 is located downstream of the light source 102 and upstream of the digital micromirror device 104, wherein the terms "upstream" and "downstream" refer to the direction of propagation of the light L emitted by the light source 102. The optical unit 116 serves to convert the light L emitted by the light source 102 into at least two input light beams L1, L2. In the specific embodiment shown in FIG. 1, the optical unit 116 is configured to split the light L emitted by the light source 102 into two input light beams L1, L2 which propagate simultaneously along spatially separated incidence beam paths I1, I2 toward the DMD 104. The optical unit 102 ensures that the two incidence beam paths I1, I1 are coincident on the digital micromirror device 104.

In the example shown in FIG. 1, it is assumed that the mirrors 106 located in the upper (shaded) rows of the digital micromirror device 104 are in a first switching state, while the mirrors 106 located in the lower (non-shaded) rows of the digital micromirror device 104 are in a second switching state. In this respect, FIG. 1 is of course a highly simplified illustration with a small number of mirrors. In reality, the digital micromirror device 104 may contain a large number (e.g. thousands) of mirrors. The portion of the first input light beam L1 falling on the upper mirrors 106, which are in the first switching state, is reflected by these mirrors 106 onto the first detector unit 110. In contrast, the portion of the first input light beam L1 incident on the lower mirrors 106, which are in the second switching state, is reflected away from the detector device 108 by the lower mirrors 106, for example toward a beam dump. Correspondingly, the portion of the second input light beam L2 falling on the upper mirrors 106, which are in the first switching state, is reflected by these mirrors 106 onto the second detector unit 112. In contrast, the portion of the second input light beam L2 incident on the lower mirrors 106, which are in the second switching state, is reflected away from the detector device 108 by the lower mirrors 106 toward the beam dump.

The digital micromirror device 104 can be used to perform a beam profile measurement on each of the input light beams L1, L2. For this purpose, the controller 114 causes the digital micromirror device 104 to selectively switch the mirrors 106 between the first and second switching states. Depending on its switching state, each mirror 106 reflects the input light beams L1, L2 either toward or away from the respective detector unit 110, 112. Thus, the intensities of the input light beams L1, L2 detected by the detector units 110 and 112, respectively, can be easily modulated by switching the individual mirrors 106 of the digital micromirror device 104. As a result, a complex, time-varying profile can be cut from the light L. This profile is detected by the detector device 108 and analyzed under the guidance of the controller 114 to implement a beam profile measurement.

To completely characterize the spatial distribution of a Gaussian light beam, at least two beam profile measurements are required. In conventional systems, these beam profile measurements are performed at two different locations in the beam path. For this purpose, usually two beam characterization units are provided at different locations in the beam path, each characterization unit being a combination of a position sensitive device (PSD) and a device adapted for knife edge measurements. Unlike these conventional systems, the light beam characterization system 100 uses a single beam characterization unit in the form of the digital micromirror device 104. To make this possible, the optical unit 116 generates the two input light beams L1, L2 from the light L. Under the guidance of the controller 114, the beam profile measurement is performed on each of the input laser beams L1, L2.

According to the specific embodiment of FIG. 1, the optical unit 116 comprises a beam splitter 118 which is located downstream of the light source 102 in the beam path of the light L. The beam splitter 118 generates the first input light beam L1 by transmitting the light L emitted by the light source 102, while it generates the second input light beam L2 by reflecting the light L emitted by the light source 102. Accordingly, the light L is split into the input light beams L1, L2 which subsequently propagate along the first and second incidence beam paths I1 and I2, respectively, in a spatially separated manner toward the digital micromirror device 104. The optical unit 116 generates the input light beams L1, L2 in a way that different axial beam positions thereof are imaged onto the digital micromirror device 104. Accordingly, the input light beams L1, L2 represent the light L emitted by the light source 102 at two different axial positions. In order to perform two beam profile measurements corresponding to measurements at two different axial positions in the beam path of the light L, the first input light beam L1 propagating from the digital micromirror device 104 along a first reflexing beam path R1 is detected by the first detector unit 110, and the second input light beam L2 propagating from the digital micromirror device 104 along a second reflexion beam path R2 is detected by the second detector unit 112. In the configuration shown in FIG. 1, the two beam profile measurements can be performed simultaneously.

As shown in FIG. 1, each of the first and second reflexion beam paths R1, R2 may include one or more focusing lenses 124, 126, respectively, which are located downstream of the digital micromirror device 104. The focusing lenses 124, 126 serve to focus the input light beams I1, I2 onto the detector units 110, 112. Due to the focusing effect of the lenses 124, 126, the detector units 110, 112 can be small in size.

As shown in FIG. 1, the optical unit 116 of the light beam characterization system 100 may further include an optical redirecting element 120 such as a mirror element or a prism and one or more lenses 122 which are arranged in this order within the incidence beam path I2 downstream of the beam splitter 118. The redirecting element 120 directs the second input light beam L2 reflected at the beam splitter 118 toward the lens 122 which focuses the second input light beam L2 and directs it onto the digital micromirror device 104.

The beam splitter 118 may be configured as dichroic element having a wavelength-dependent characteristic which is adapted to split the light L emitted by the light source 102 with respect to its spectral composition. For example, it may be assumed that the light source 102 emits the light L in a wide wavelength range including visible light and (near-) infrared light. In such a case, the detector units 110, 112 may be selected such that they differ in terms of their spectral sensitivities. Thus, the first detector unit 110 may be adapted to detect a first spectral sub-range of smaller wavelengths including visible light, while the second detector unit 112 may be adapted to detect a second spectral sub-range of larger wavelengths including (near-) infrared light. In this example, the beam splitter 118 may be configured to provide for a spectral splitting which is adapted to the spectral sensitivities of the detector units 110, 112. For instance, one of the detector units 110, 112 may be a silicone-based detector which is sensitive only up to 1100 nm, while the other detector unit may be a InGaAs-based detector having a good sensitivity in the range of 1000 to 1700 nm.

Figure 2:
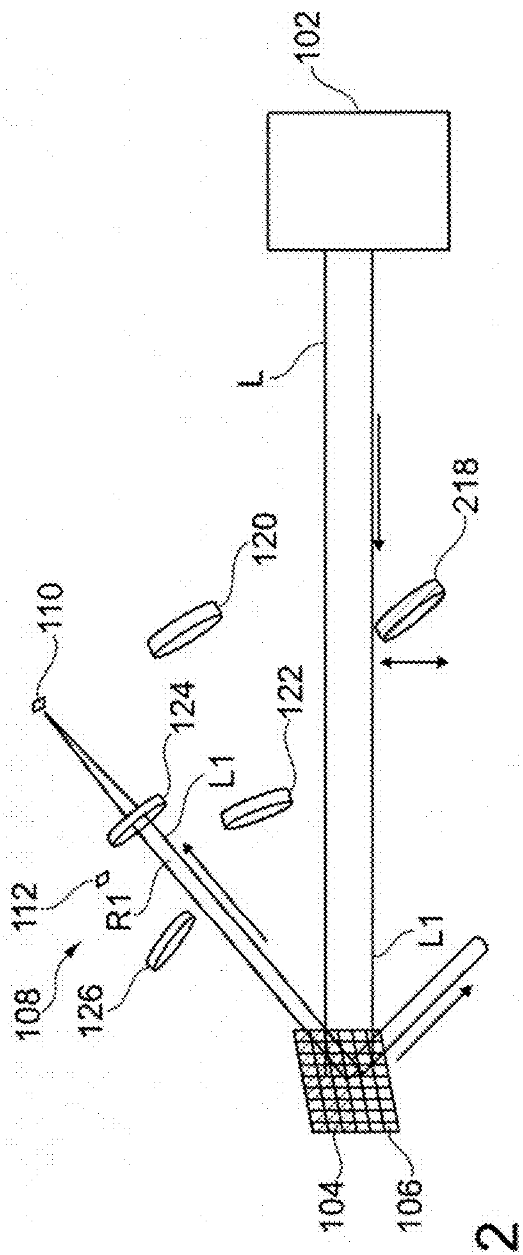
FIG. 2 is a schematic diagram showing the light beam characterization system according to another embodiment in which the optical unit includes a movable reflector sequentially directing the input light beams onto the digital micromirror device.
Figure 3:
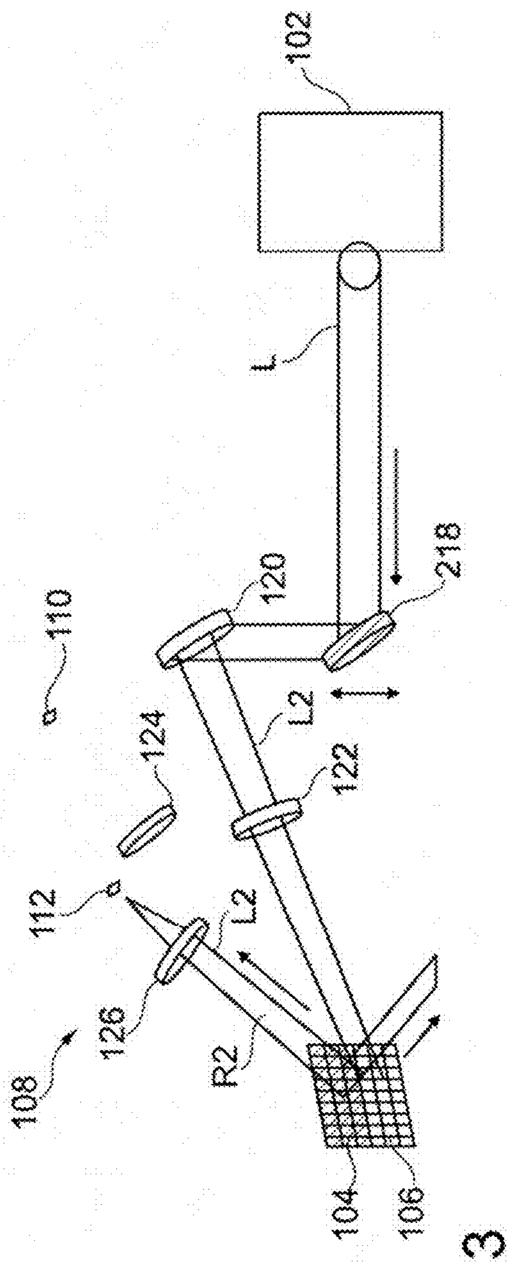
FIG. 3 is a schematic diagram showing the light beam characterization system of FIG. 2 in a state in which the movable reflector is inserted into the beam path.

FIGS. 2 and 3 show another embodiment of the light beam characterization system 100. In contrast to the configuration of FIG. 1, this embodiment is configured such that the first and second input light beams L1, L2 are detected sequentially in time. Only those aspects in which the embodiment of FIGS. 2 and 3 differs from the configuration shown in FIG. 1 are explained below. For simplicity, the controller 114 shown in FIG. 1 is omitted in the other Figures.

Instead of the beam splitter 118 used in the configuration of FIG. 1, the embodiment shown in FIGS. 2 and 3 comprises a reflector 218 such as a mirror which can be selectively introduced into and withdrawn from the beam path of the light L emitted by the light source 102. FIG. 2 shows the reflector 218 in a first state in which it is retracted from the beam path of the light L. In contrast, FIG. 3 shows the reflector 218 in a second state in which it is inserted into the beam path of the light L. The light beam characterization system 100 may include an actuator which is capable of moving the reflector 218 in a direction perpendicular to the beam path of the light L.

In the first state of the reflector 218 shown in FIG. 2, the light L emitted by the light source 102 passes by the reflector 218 located outside the beam path. Accordingly, the light L is incident on the digital micromirror device 104 without being affected by the reflector 218. The unaffected light L represents the first input light beam L1. The portion of the first input light beam L1 reflected from the mirrors 106 in their first switching state propagates along the first reflexion beam path R1 through the first lens 124 toward the first detector unit 110.

In the second state of the reflector 218 shown in FIG. 3, the light L emitted from the light source 102 is incident on the reflector 218 located in the beam path. The light L reflected from the reflector 218 represents the second input light beam L2. The second input light beam L2 is reflected toward the optical redirecting element 120, which directs the second input light beam L2 through the lens 122 onto the digital micromirror device 104. The portion of the second light beam L2 reflected from the mirrors 106 in their first switching state propagates along the reflexion beam path R2 through the second lens 126 toward the second detector unit 112. Thus, by moving the reflector 218 into and out of the beam path of the light L, the first and second input light beams L1, L2 are alternately detected by the first and second detector units 110 and 112, respectively.

Figure 4:
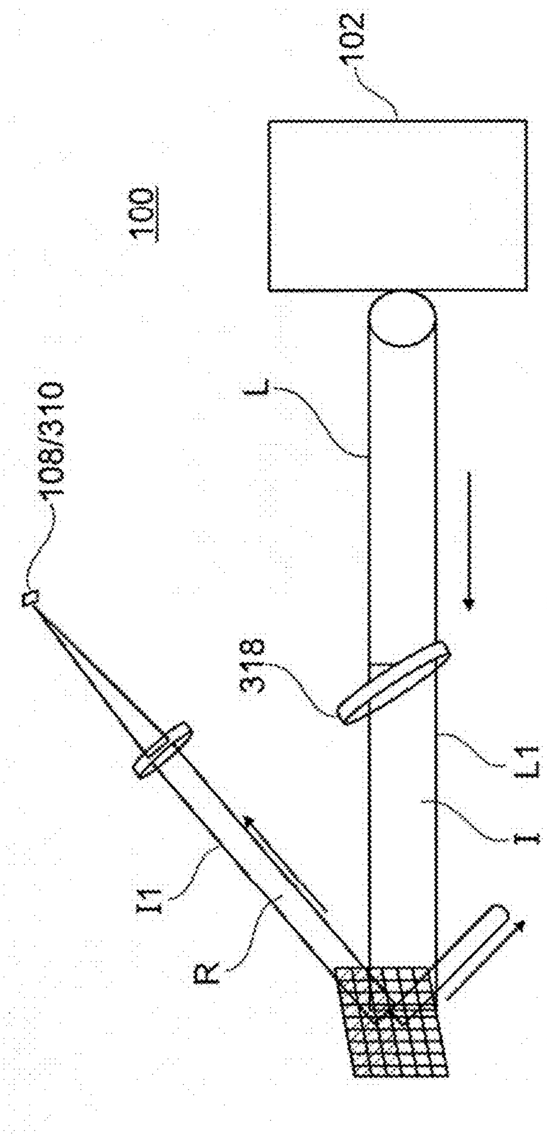
FIG. 4 is a schematic diagram showing the light beam characterization system according to another embodiment in which the optical unit includes a variable optical element sequentially directing the input light beams onto the digital micromirror device.
Figure 5:
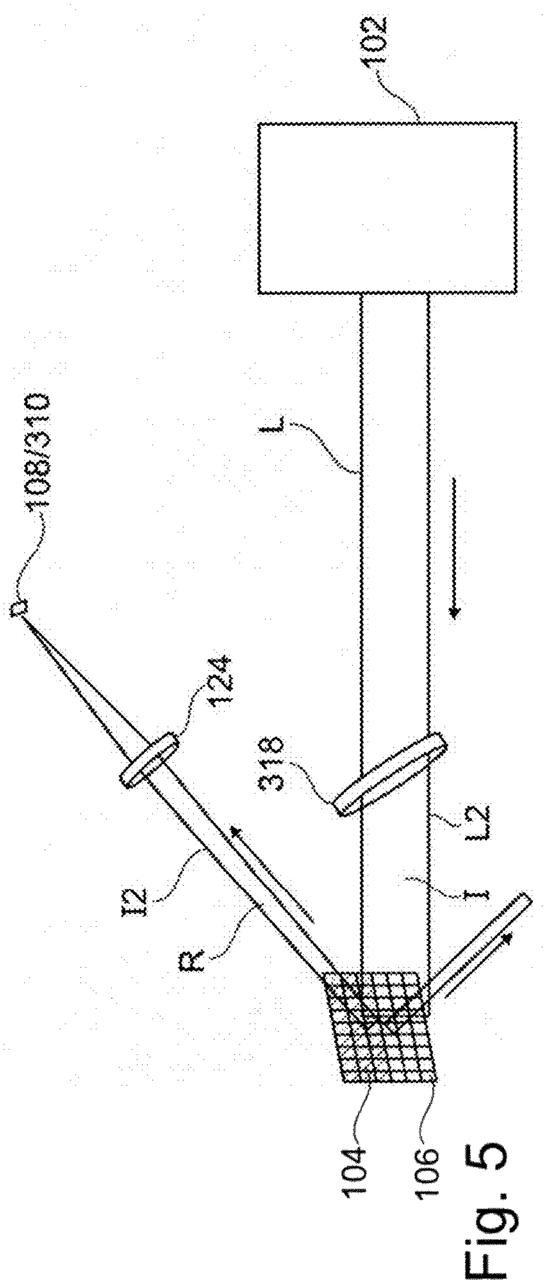
FIG. 5 is a schematic diagram showing the light beam characterization system of FIG. 2 in a state in which the variable optical element is axially displaced along the beam path.

FIGS. 4 and 5 show another embodiment of the light beam characterization system 100. Like the configuration shown in FIGS. 2 and 3, this embodiment is configured to detect the first and second input light beams L1, L2 in temporal sequence. However, in contrast to the configuration of FIGS. 2 and 3, the embodiment shown in FIGS. 4 and 5 operates with a single beam path along which the first and second input light beams L1, L2 propagate toward the digital micromirror device 104. In the following, only those aspects in which the embodiment of FIGS. 4 and 5 differs from the previous configuration will be explained.

Instead of the movable reflector 218 used in the configuration of FIGS. 2 and 3, the embodiment shown in FIGS. 4 and 5 comprises a variable optical element 318 which can be moved along the beam path of the light L emitted by the light source 102. The optical element 318 may comprise one or more optical lenses which are axially driven by a suitable actuator. FIG. 4 shows the variable optical element 318 in a first state in which it is located in a first axial position along the beam path. In contrast, FIG. 5 shows the variable optical element 318 in a second state in which it is located in a second axial position along the beam path. As can be seen in FIGS. 4 and 5, the light L passing through the variable optical element 318 in its different axial positions propagates along a common beam path I toward the digital micromirror device 104.

In the embodiment shown in FIGS. 4 and 5, the detector device 108 comprises a single detector unit 310 sequentially receiving the first and second input light beams L1, L2. Accordingly, there is only one common reflexion beam path R along which the input light beams L1, L2 propagate toward the detector device 108.

The light L emitted from the light source 102 is focused by the variable optical element 318 onto the digital micromirror device 104 in a manner which is determined by the axial position of the optical element 318 along the beam path. Accordingly, the focusing state of the light L at the digital micromirror device 104 depends on whether the variable optical element 318 is located in the first axial position or in the second axial position.

In the first axial position of the variable optical element 318 shown in FIG. 4, the light L passing through the variable optical element 318 is incident on the digital micromirror device 104 in a first focusing state. In this first focusing state, the light L represents the first input light beam L1. The portion of the first input light beam L1 reflected from the mirrors 106 in their first switching state propagates along the reflexion beam path R through the lens 124 toward the detector unit 310. In contrast, the portion of the first input light beam L1 incident on the mirrors 106, which are in the second switching state, is reflected away from the detector unit 310 toward the beam dump.

Correspondingly, in the second axial position of the variable optical element 318 shown in FIG. 5, the light L passing through the variable optical element 318 is incident on the digital micromirror device 104 in a second focusing state which is different from the first focussing state. In the second focusing state, the light L represents the second input light beam L2. The portion of the second input light beam L2 reflected from the mirrors 106 in their second switching state propagates along the reflexion beam path R through the lens 124 toward the detector unit 310. In contrast, the portion of the second input light beam L2 incident on the mirrors 106, which are in the second switching state, is reflected away from the detector unit 310 toward the beam dump.

Figure 6:
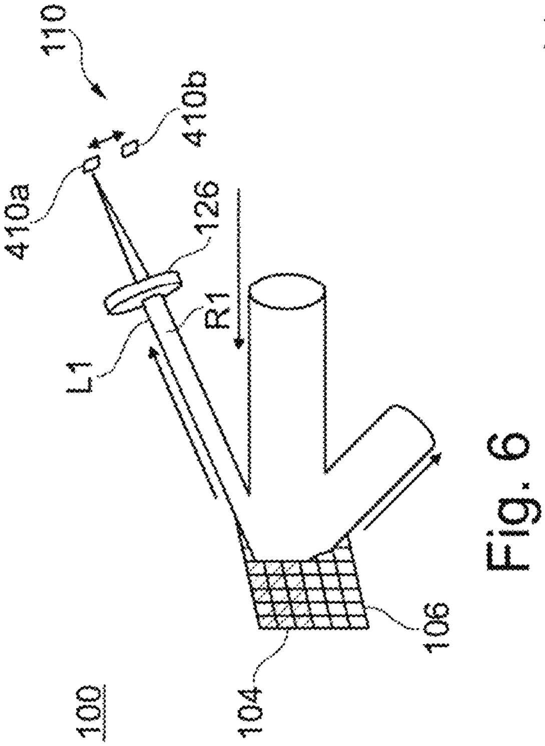
FIG. 6 is a schematic diagram showing the light beam characterization system according to another embodiment comprising two detector elements of different spectral sensitivities.

FIG. 6 illustrates another embodiment of the light beam characterization system 100. The embodiment of FIG. 6 may be based on any one of the configurations shown in FIGS. 1 to 5. For simplicity, FIG. 6 illustrates only the detection of the first input light beam L1. The operating principle described with reference to FIG. 6 applies in the same manner to the detection of the second input light beam L2.

In the embodiment of FIG. 6, the first detector unit 110 comprises two detector elements 410*a*, 410*b* which can be individually introduced into the beam path R1 of the input light beam L1 to be located in a beam profile measurement position. An actuator may be provided to move the detector units 410*a*, 410*b* into and out of the beam path R1.

The detector units 410*a*, 410*b* are sensitive to different wavelengths. Specifically, the spectral sensitivities of the detector elements 410*a*, 410*b* are adapted to the spectral composition of the light L emitted by the light source 102. For example, if the embodiment of FIG. 6 is based on the configuration shown in FIG. 1, the spectral sensitivities of the detector elements 410*a*, 410*b* may be selected such that they collectively cover the first spectral sub-range that is created by the dichroic beam splitter 118. For instance, the first detector element 410*a* may be sensitive to lower wavelengths of the first spectral sub-range, while the second detector element 410*b* may be sensitive to larger wavelengths of the first spectral sub-range Correspondingly, the spectral sensitivities of the detector elements assigned to the second input light beam L2 may collectively cover the second spectral sub-range that is created by the dichroic beam splitter 118. On the other hand, if the embodiment of FIG. 6 is based on any one of the configurations of FIGS. 2 to 5 that does not use the dichroic beam splitter 118, the spectral sensitivities of the detector elements 410*a*, 410*b* may collectively cover the wide wavelength range of the light L as emitted from the light source 102.

Figure 7:
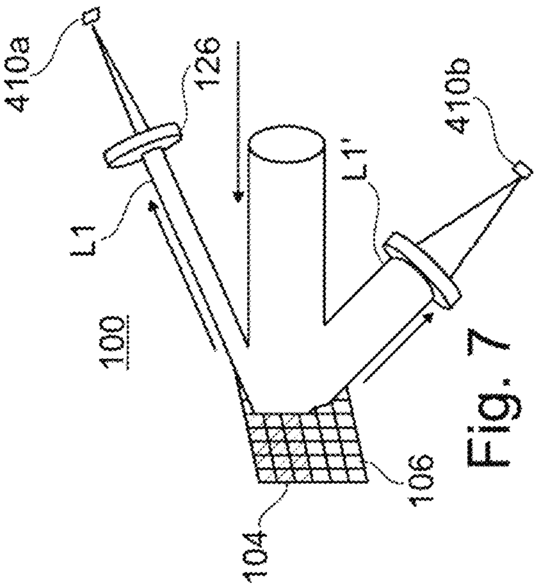
FIG. 7 is a schematic diagram showing the light beam characterization system according to another embodiment in which the digital micromirror device directs an input light beam onto two detector elements of different sensitivities.

FIG. 7 shows a modification of the configuration in FIG. 6. According to this modification, only one of the detector elements, namely the detector element 410*a* is located in the beam path of the portion of the first input light beam L1 which is reflected by the mirrors 106 that are in the first switching state. In contrast, the other detector element 410*b* is located in the beam path of the portion of the first input light beam L1 which is reflected by the mirrors 106 which are in the second switching state (denoted L1' in FIG. 7). Accordingly, the detector element 410*b* is located in a position where a beam dump is provided in the other configurations. As a result, light efficiency is increased by using light that would otherwise be lost.

Although the embodiment described above is illustrated in FIG. 7 as a modification of the configuration in FIG. 6, it should be noted that this embodiment may be suitably combined with any other of the configurations disclosed herein.

Figure 8:
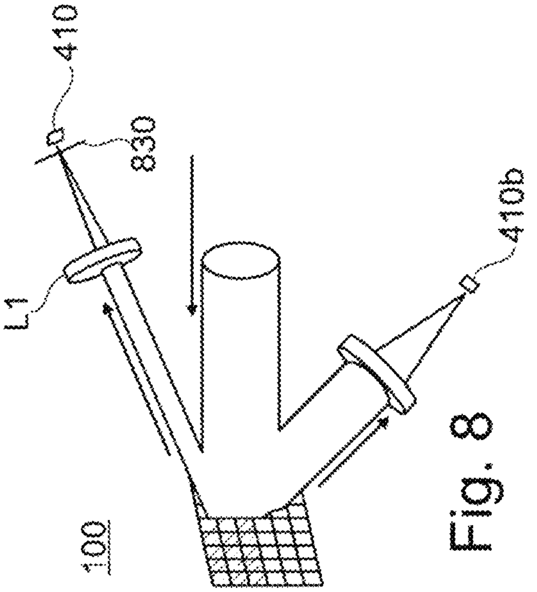
FIG. 8 is a schematic diagram showing the light beam characterization system according to another embodiment including a nonlinear crystal located upstream of the detector device.

FIG. 8 shows a modification of the configuration of FIG. 7. According to this modification, a nonlinear crystal 830 is located upstream of the detector element 410. The nonlinear crystal 830 is configured for second harmonic generation which is nonlinear optical process in which two photons of the same frequency produce a new photon with twice the frequency and thus half the wavelength of the initial photons. The nonlinear crystal 830 is arranged in the light beam focus upstream of the detector element 410 to create a second harmonic wavelength.

Although the embodiment described above is illustrated in FIG. 8 as a modification of the configuration in FIG. 7, it should be noted that this embodiment may be suitably combined with any other of the configurations disclosed herein.

Hereinafter, some examples for a beam profile measurement to be performed by the light beam characterization system 100 are explained with reference to FIGS. 9 to 15. For simplicity, the explanation below refers only to the detection of the first input light beam L1. However, the operating principle applies in the same manner to the detection of the second input light beam L2.

Figure 9:
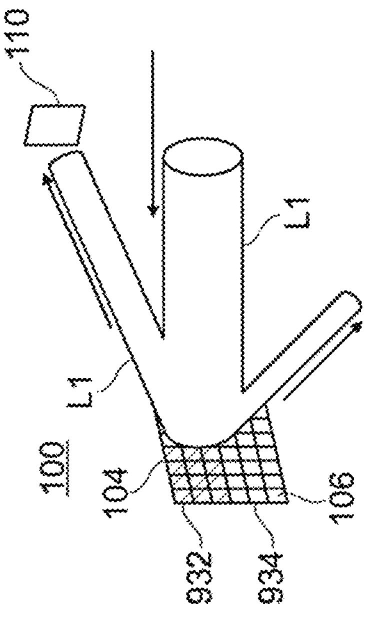
FIG. 9 is a schematic diagram illustrating a knife edge measurement performed by the light beam characterization system according to some embodiments.
Figure 10:
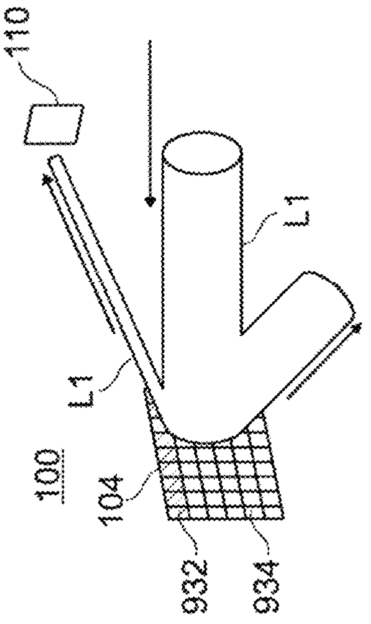
FIG. 10 is a schematic diagram illustrating the knife edge measurement in a subsequent step according to some embodiments.
Figure 11:
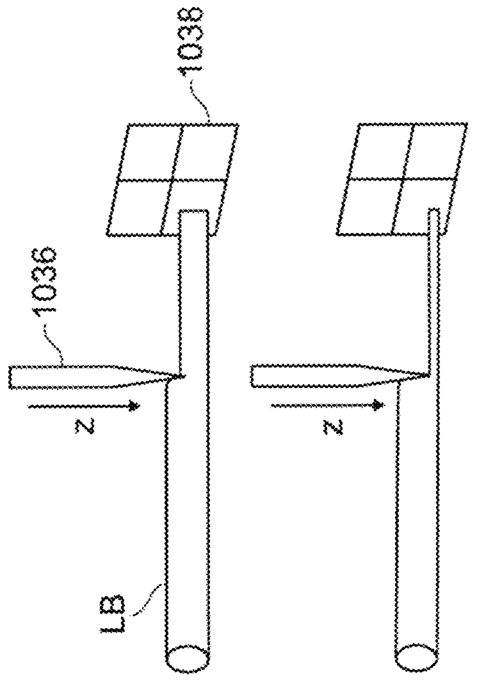
FIG. 11 is a schematic diagram illustrating a conventional knife edge measurement.
Figure 12:
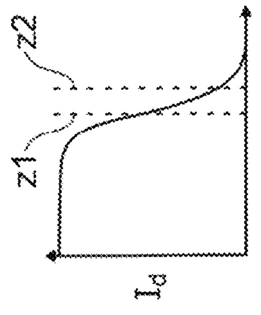
FIG. 12 is a diagram illustrating a detected light intensity as a function of a knife edge position according to some embodiments.

FIGS. 9 and 10 illustrate a knife edge measurement which can be performed by the light beam characterization system 100. In comparison, FIG. 11 shows a conventional system that is used for a knife edge measurement. FIG. 12 shows a diagram that illustrates a detected light intensity as a function of a knife edge position.

In the present example, it is assumed that the control unit 114 (see FIG. 1) switches the mirrors 106 of the digital micromirror device 104 in a sequential manner row-by-row from the first switching state, in which the mirrors 106 reflect the input light beam L1 toward the detector unit 110, into the second switching state, in which the mirrors 106 reflect the input light beam L1 away from the detector unit 110.

FIG. 9 shows an initial situation in which the mirrors 106 in three upper (shaded) rows 932 are in the first switching state, while the mirrors 106 in three lower (non-shaded) rows 934 are in the second state. Accordingly, the upper rows 932 reflect a portion of the input light beam L1 onto the detector unit 110. In contrast, the lower rows 934 reflect the remaining portion of the input light beam L1 away from the detector unit 110. As a result, only the portion of the input light beam L1 reflected by the upper rows 932 is detected by the detector unit 110.

Then, row-by-row (from bottom to top in FIG. 9), the mirrors 106 that are in the first state are brought into the second switching state. Thus, as shown in FIG. 10, the number of rows 932 in which the mirrors 106 are in the first switching state decreases, while the number of rows 934 in which the mirrors 106 are in the second state increases. Accordingly, the portion of the input light beam L1 received by the detector unit 110 become smaller, while the remaining portion of the input light beams L1 reflected away from the detector unit 110 becomes larger. As a result, a beam profile measurement is performed which simulates a vertical knife edge scanned across the input light beam L1.

As a comparative example, FIG. 11 illustrates a conventional system using a mechanical knife edge-like component 1036 that is scanned across a light beam LB to perform a knife edge measurement. In the comparative example shown in FIG. 11, it is assumed that the knife edge-like component 1036 is moved across the light beam LB in vertical z direction. A scanning position at the top left in FIG. 11 is referred to as z1, and a scanning position at the bottom left in FIG. 12 is referred to as z2. FIG. 12 illustrates an intensity Id detected by a light detector 1038, for example a position sensitive detector (PSD), as function of the scan position z. A corresponding intensity distribution is acquired when performing the knife edge measurement by means of the digital micromirror device 104.

Figure 14:
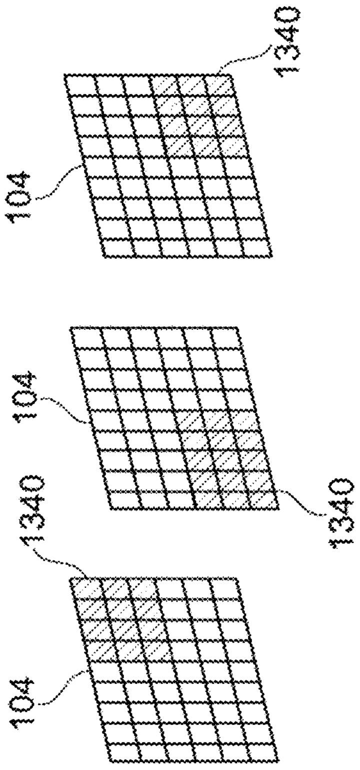
FIG. 14 is a diagram illustrating successive switching states of the digital micromirror device to form the quadrants according to some embodiments.
Figure 13:
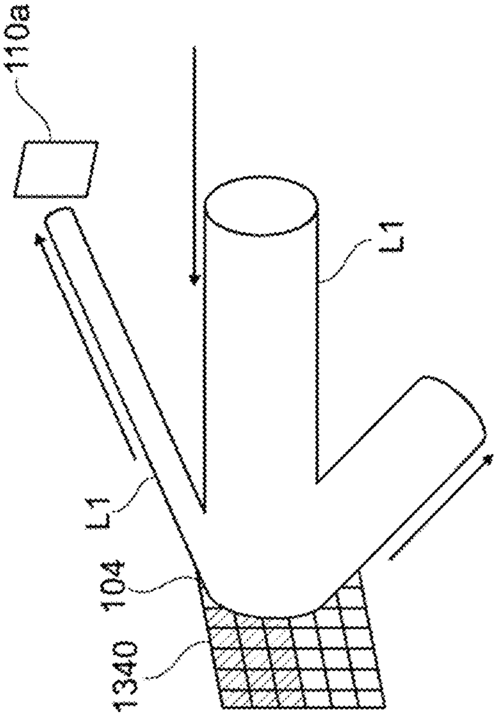
FIG. 13 is a schematic diagram illustrating a four-quadrant measurement performed by the light beam characterization system according to some embodiments.
Figure 15:
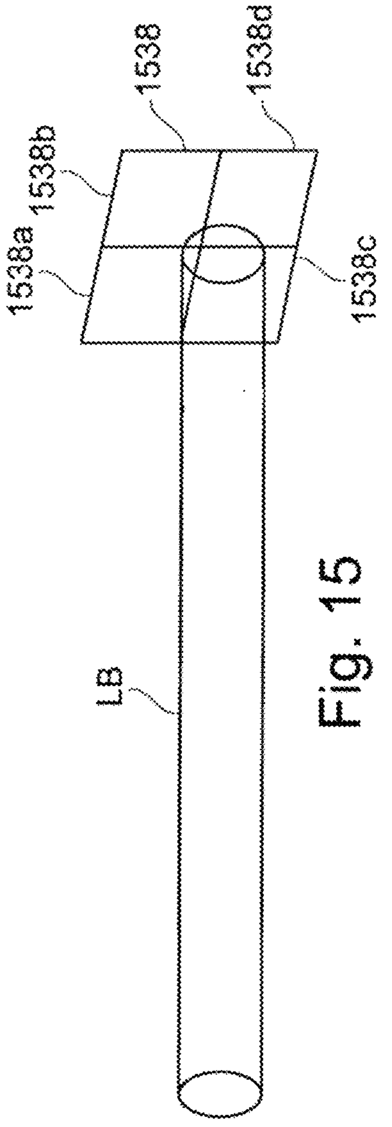
FIG. 15 is a diagram illustrating a conventional four-quadrant measurement.

FIGS. 13 and 14 illustrate a four-quadrant measurement which is another example of a beam characterization measurement to be performed by the light beam characterization system 100. In comparison, FIG. 15 shows a conventional system that is used for a four-quadrant measurement.

In the example shown in FIGS. 13 and 14, the control unit 114 (see FIG. 1) switches a two-dimensional sub-array of the mirrors 106 of the digital micromirror device 104 to the first switching state while maintaining the remaining mirrors 106 in the second switching state. FIG. 13 shows an initial situation in which the mirrors 160 in the upper left portion of the digital micromirror device 104 are in the first switching state, and the remaining mirrors 106 are in the second switching state. The mirrors 106 in the first switching state represent the two-dimensional sub-array forming a quadrant 1340 in the upper left portion of the rectangular array of mirrors 106. As a result, the mirrors 106 forming the quadrant 1340 reflect a portion of the input light beam L1 toward the detector 110. In contrast, the mirrors 106 outside the quadrant 1340 reflect the remaining portion of the input light beam L1 away from the detector unit 110.

Subsequently, as illustrated in FIG. 14. the mirrors 106 of the digital micromirror device 104 are switched in a way that the quadrant 1340, which directs a portion of the beam L1 onto the detector unit 110*a*, is shifted from the upper left portion to the upper right portion, then from upper right portion to the lower left portion, and finally from the lower left portion to the lower right portion of the digital micromirror device 104. Accordingly, the quadrants on the digital micromirror device 104 are activated one after the other, so that only the portion of the input light beams L1 reflected from the activated quadrant reaches the detector unit 110.

Based on the intensities detected by the detector unit 110 in each of the four quadrant activations, a centroid of the light is determined from which the position of the input light beam L1 can be derived.

As a comparative example, FIG. 15 illustrates a conventional system using a position sensitive detector 1538 to perform a four-quadrant measurement. The position sensitive detector 1538 may be four-quadrant diode which comprises four separate detector elements 1538*a*, 1538*b*, 1538*c*, 1538*d* to determine the centroid of the laser beam LB.

In contrast to the conventional system shown in FIG. 15, the configuration of FIG. 13 does not require a complex and expensive position sensitive sensor (PSD).

As used herein the term “and/or” includes any and all combinations of one or more of the associated listed items and may be abbreviated as “/”.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article “a” or “the” in introducing an element should not be interpreted as being exclusive of a plurality of elements. Likewise, the recitation of “or” should be interpreted as being inclusive, such that the recitation of “A or B” is not exclusive of “A and B,” unless it is clear from the context or the foregoing description that only one of A and B is intended. Further, the recitation of “at least one of A, B and C” should be interpreted as one or more of a group of elements consisting of A, B and C, and should not be interpreted as requiring at least one of each of the listed elements A, B and C, regardless of whether A, B and C are related as categories or otherwise. Moreover, the recitation of “A, B and/or C” or “at least one of A, B or C” should be interpreted as including any singular entity from the listed elements, e.g., A, any subset from the listed elements, e.g., A and B, or the entire list of elements A, B and C.

LIST OF REFERENCE SIGNS

100 light beam characterization system
102 light source
104 digital micromirror device
106 mirror
108 detector device
110, 112 detector unit
114 controller
116 optical unit
118 beam splitter
120 redirecting element
122, 124, 126 lens
218 reflector
310 detector unit
318 variable optical element
410*a*, 410*b* detector element
830 nonlinear crystal
832, 934 row
1036 knife edge-like component
1038 light detector
1340 quadrant
1538 position sensitive detector
1538*a,b,c,d* detector element
L light
L1, L2 input light beam
LB light beam
I, I1, I2 incidence beam path
R, R1, R2 reflexion beam path

The invention claimed is:

1. A light beam characterization system for characterizing a light beam emitted by a light source, the light beam characterization system comprising:

a detector comprising at least one detector unit configured to detect light emitted by the light source, a micro-opto-electromechanical system comprising an array of mirrors, each respective mirror being switchable between a first switching state and at least a second switching state, wherein, in the first switching state, the respective mirror reflects the light onto the detector, and in the second switching state, the respective mirror reflects the light away from the detector, an optical unit configured to direct the light in a form of at least two different input light beams onto the micro-opto-electromechanical system, wherein the at least two different input light beams represent the light emitted by the light source at two different axial positions, and a controller configured to cause a respective beam profile measurement to be performed on the light detected by the at least one detector unit for each of the at least two input light beams while selectively switching the mirrors in the array of mirrors between the first switching state and the second switching state, thereby obtaining at least two beam profile measurements corresponding to the two different axial positions.

2. The light beam characterization system according to claim 1, wherein the micro-opto-electromechanical system includes a digital micromirror device.

3. The light beam characterization system according to claim 1, wherein the optical unit is configured to generate the at least two input light beams from the light such that the two different axial beam positions of the at least two input light beams are imaged onto the micro-opto-electromechanical system simultaneously or sequentially.

4. The light beam characterization system according to claim 1, wherein the optical unit is configured to direct the at least two input light beams simultaneously onto the micro-opto-electromechanical system, and wherein the detector comprises at least two detector units, each detector unit being configured to detect a different one of the at least two input light beams reflected by the mirrors of the array of mirrors of the micro-opto-electromechanical system in the first switching state.

5. The light beam characterization system according to claim 4, wherein the optical unit is configured to direct the at least two input light beams simultaneously along different incidence beam paths onto the micro-opto-electromechanical system so that the mirrors of the array of mirrors of the micro-opto-electromechanical system reflect the at least two input light beams in the first switching state simultaneously along different reflexion beam paths onto the at least two detector units.

6. The light beam characterization system according to claim 1, wherein the optical unit comprises a beam splitter configured to generate a first input light beam of the two input light beams by transmitting the light, and to generate a second input light beam of the two input light beams by reflecting the light.

7. The light beam characterization system according to claim 6, wherein the optical unit comprises an optical redirecting element located downstream of the beam splitter and configured to direct one of the two input light beams onto the micro-opto-electromechanical system.

8. The light beam characterization system according to claim 1, wherein the optical unit is configured to direct the at least two input light beams successively onto the micro-opto-electromechanical system, wherein the detector comprises only the one detector unit configured to detect the at least two input light beams reflected by the mirrors of the array of mirrors of the micro-opto-electromechanical system in the first switching state.

9. The light beam characterization system according to claim 8, wherein the optical unit is configured to direct the at least two input light beams sequentially along a common incidence beam path onto the micro-opto-electromechanical system so that mirrors of the array of mirrors of the micro-opto-electromechanical system reflect the at least two input light beams in the first switching state sequentially along a common reflexion beam path onto the one detector unit.

10. The light beam characterization system according to claim 1, wherein the optical unit comprises a variable optical element.

11. The light beam characterization system according to claim 1, wherein each detector unit of the at least one detector unit comprises at least two detector elements that are sensitive to different wavelengths.

12. The light beam characterization system according to claim 11, wherein each detector element is selectively movable into and out of a beam profile measurement position.

13. The light beam characterization system according to claim 1, wherein the controller is configured to sequentially switch rows or columns of mirrors of the array of mirrors of the micro-opto-electromechanical system from the first switching state into the second switching state or vice versa to generate a scanning knife-edge light pattern on the detector.

14. The light beam characterization system according to claim 1, wherein the controller is configured to switch a two-dimensional sub-array of the array of mirrors of the micro-opto-electromechanical system from the first switching state into the second switching state or vice versa while leaving remaining mirrors of the array of mirrors in the one of the first switching state and the second switching state to generate an area light pattern on the detector.

15. The light beam characterization system according to claim 1, further comprising a focusing optical element located downstream of the micro-opto-electromechanical system and configured to focus the at least two input light beams onto the detector.

16. The light beam characterization system according to claim 1, further comprising a nonlinear crystal located upstream of the detector and configured for second harmonic generation.

17. A method for light beam characterization, the method comprising:

detecting light emitted by a light source using at least one detector unit included in a detector, directing, via an optical unit, the light in a form of at least two different input light beams onto a micro-opto-electromechanical system, wherein the at least two different input light beams represent the light emitted by the light source at two different axial positions, wherein the micro-opto-electromechanical system comprises an array of mirrors, each respective mirror being switchable between a first switching state and at least a second switching state, wherein, in the first switching state, the respective mirror reflects the light onto the detector, and in the second switching state, the respective mirror reflects the light away from the detector, and performing a respective beam profile measurement on the light detected by the at least one detector unit for each of the at least two input light beams by selectively switching the mirrors of the array of mirrors between the first switching state and the second switching state, thereby obtaining at least two beam profile measurements corresponding to the two different axial positions.

* * * * *